No. 853,019. PATENTED MAY 7, 1907.
C. & E. LUDVIGSEN.
HORSESHOE CALK AND PROCESS OF MAKING THE SAME.
APPLICATION FILED MAR. 15, 1906.
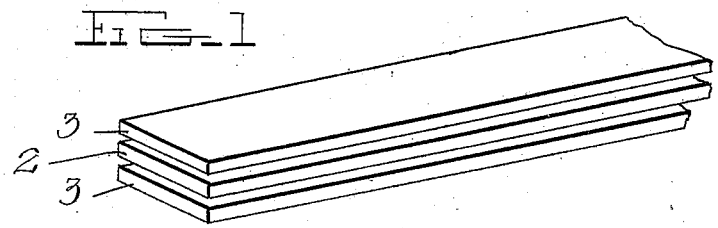
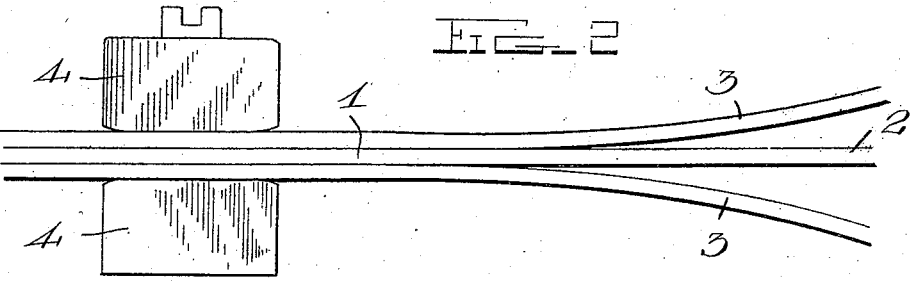
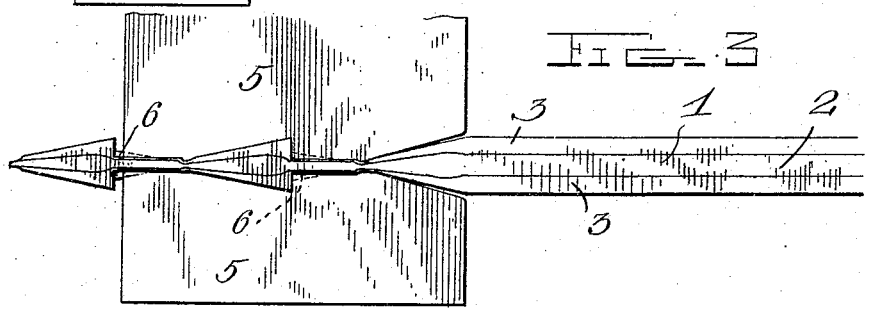
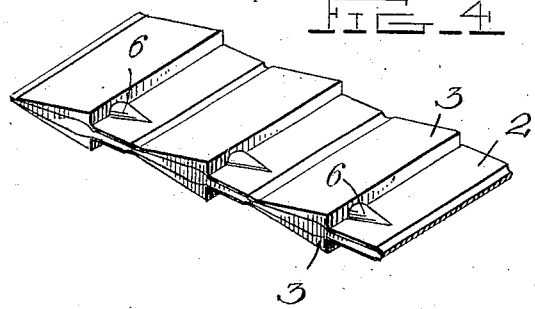
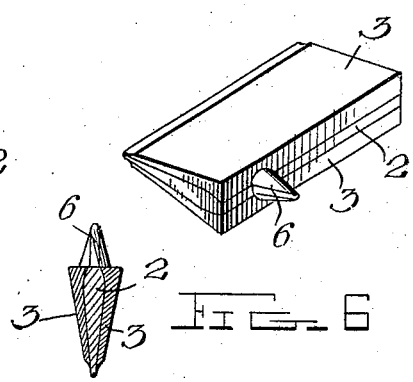
Witnesses
Christ Ludvigsen Inventors
& Eric Ludvigsen
by
Attorneys

UNITED STATES PATENT OFFICE.

CHRIST LUDVIGSEN AND ERIC LUDVIGSEN, OF JACKSON, MINNESOTA.

HORSESHOE-CALK AND PROCESS OF MAKING THE SAME.

No. 853,019.     Specification of Letters Patent.     Patented May 7, 1907.

Application filed March 15, 1906. Serial No. 306,283.

*To all whom it may concern:*

Be it known that we, CHRIST LUDVIGSEN and ERIC LUDVIGSEN, citizens of the United States, residing at Jackson, in the county of Jackson and State of Minnesota, have invented certain new and useful Improvements in Horseshoe-Calks and Processes of Making the Same; and we do declare the following to be a full, clear, and exact description of the invention, such as will enable others skilled in the art to which it appertains to make and use the same.

This invention relates to improvements in horseshoe calks and the process of making the same.

The object of the invention is to provide a horseshoe calk having a central core of steel or hard metal welded between outer layers of iron, said calks being formed in multiple from a previously prepared bar, and afterward cut or sheared from said bar.

With the above and other objects in view, the invention consists of certain novel features of construction, combination and arrangement of parts, as will be hereinafter described and claimed.

In the accompanying drawings:—Figure 1 is a perspective view of the iron and steel plates forming the calk bar, showing their relative arrangement before being welded together; Fig. 2 is an edge view of the same, showing the manner in which the plates or bars are welded; Fig. 3 is a similar view, showing the manner in which the calks are shaped on the bar; Fig. 4 is a perspective view of the bar after the plates of the same have been welded together and the calks formed or shaped therein; Fig. 5 is a similar view of a calk after being severed from the bar; and Fig. 6 is a vertical cross sectional view of the same.

Referring more particularly to the drawings, 1 denotes the bar from which the calks are made, said bar consists of a central plate or layer 2 of steel and outer layers 3 of iron, said plates or layers of steel and iron being of a width corresponding to the length of the calks. In preparing the bar 1 the plates 2 and 3 are first welded together by means of suitably constructed dies 4, after which the bar is run through another set of dies 5 by means of which a series of calks are formed or shaped in the bar, after which the calks are sheared or severed apart and dressed off in condition for use. When the calks are being shaped or formed in the bar, an attaching lug or point 6 is formed on the inner edges of the same by the shaping dies 5, said point being left projecting from the edge of the calks when the same are sheared apart, said point being adapted to facilitate the welding of the calk on the toe of the shoe.

In most steel pointed calks now in use, it is necessary for the blacksmith to weld the parts of the same together before or after they are applied to the shoe, whereas, in the present invention the steel plate and the outer plates of iron are welded together before or during the process of manufacturing the calk thereby saving an immense amount of time and labor when the calks are applied to the shoe. This advantage will be readily appreciated by blacksmiths and others skilled in the art to which the device appertains.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described our invention, what we claim as new, and desire to secure by Letters-Patent, is,—

1. The process of making a plurality of horse shoe calks in one operation which consists in first forming a bar of a width to correspond with the length of the calks to be formed by welding together a plate of steel between two plates of iron, then passing the so formed bar between the shaping dies to form a connected series of calks with an attaching lug formed on the top edge of each, then shearing said so formed calks from said bar and dressing them for use.

2. A series of horse shoe calks formed in and adapted to be cut from a bar, said bar consisting of outer layers of iron and an inner layer of steel welded together and pressed into shape to form said calks.

3. The process of making horse shoe calks which consists in first forming a bar by welding together a plate of steel between two plates of iron, said plates being of a width to correspond with the length of the calks to be formed, then passing the so-formed bar between shaping dies to form a connected series of calks, and then shearing said so-formed calks from said bar.

In testimony whereof we have hereunto set our hand in presence of two subscribing witnesses.

CHRIST LUDVIGSEN.
ERIC LUDVIGSEN.

Witnesses:
F. B. FABER,
ETHEL C. SAWYER.